(12) United States Patent
McCann (10) Patent No.: US 8,452,955 B2
(45) Date of Patent: May 28, 2013

(54) METHOD AND APPARATUS FOR ENCRYPTION AND PASS-THROUGH HANDLING OF CONFIDENTIAL INFORMATION IN SOFTWARE APPLICATIONS

(75) Inventor: Daniel McCann, Regina (CA)

(73) Assignee: Netsecure Innovations Inc., Regina, Saskatchewan (CA)

( * ) Notice: Subject to any disclaimer, the term of this patent is extended or adjusted under 35 U.S.C. 154(b) by 871 days.

(21) Appl. No.: 11/918,093

(22) PCT Filed: May 29, 2007

(86) PCT No.: PCT/CA2007/000939
§ 371 (c)(1),
(2), (4) Date: May 16, 2008

(87) PCT Pub. No.: WO2007/147230
PCT Pub. Date: Dec. 27, 2007

(65) Prior Publication Data
US 2009/0307482 A1    Dec. 10, 2009

(30) Foreign Application Priority Data

Jun. 19, 2006   (CA) ..................................... 2550698

(51) Int. Cl.
*H04L 29/06* (2006.01)
(52) U.S. Cl.
USPC .............. 713/153; 713/150; 713/152; 726/26
(58) Field of Classification Search
USPC .............. 726/12, 22, 9, 20, 26; 713/160, 161, 713/68, 192, 168, 172, 150–153, 189; 705/50, 705/64–66; 715/224–226
See application file for complete search history.

(56) References Cited

U.S. PATENT DOCUMENTS

| | | | | |
|---|---|---|---|---|
| 6,865,680 | B1 * | 3/2005 | Wu et al. .......................... | 726/12 |
| 7,342,918 | B2 * | 3/2008 | Keenan et al. ................. | 370/352 |
| 7,376,826 | B2 * | 5/2008 | Tardo et al. .................... | 713/151 |
| 7,590,860 | B2 * | 9/2009 | Leporini et al. ............... | 713/185 |
| 7,835,521 | B1 * | 11/2010 | Pinheiro ....................... | 380/239 |
| 2002/0023112 | A1 | 2/2002 | Avital | |
| 2002/0062342 | A1 * | 5/2002 | Sidles .......................... | 709/203 |
| 2005/0066186 | A1 * | 3/2005 | Gentle et al. .................. | 713/193 |
| 2006/0136717 | A1 * | 6/2006 | Buer et al. ..................... | 713/155 |
| 2007/0174908 | A1 * | 7/2007 | Eshun et al. .................... | 726/12 |

* cited by examiner

*Primary Examiner* — Jeffrey D Popham
*Assistant Examiner* — Daniel Potratz
(74) *Attorney, Agent, or Firm* — Patterson Thuente Pedersen P.A.

(57) ABSTRACT

Methods and apparatus for securely transmitting sensitive information to a remote device at the request of an application program are provided. The application program generates a request to a secure channel provider to make a transmission to a remote device. A first message is passed from the from the application program to the secure channel provider containing insertion point codes indicating locations within the first message where the sensitive information should be inserted. Sensitive information is obtained from a source outside of the application program and the sensitive information is inserted into the first message at the locations in the first message indicated by the insertion point codes to form a second message containing the sensitive information. The second message is encrypted and this encrypted message is transmitted to the remote device. The sensitive information is unaccessed by the application program during the execution of the method.

33 Claims, 10 Drawing Sheets

PRIOR ART

METHOD AND APPARATUS FOR ENCRYPTION AND PASS-THROUGH HANDLING OF CONFIDENTIAL INFORMATION IN SOFTWARE APPLICATIONS

RELATED APPLICATIONS

This application claims priority to PCT Application No. PCT/CA2007/000939 filed May 29, 2007, and Canadian Application No. 2,550,698 filed Jun. 19, 2006, the disclosures of which are hereby incorporated by reference in their entireties.

This invention is in the field of transmission of data over computer networks and more particularly to methods and apparatus for secure transmission of sensitive information contained in the data.

BACKGROUND

Secure transfer of information over a network has been a vital concern since the inception of networked computing. The problem of transferring confidential information from one point to another across an untrusted network has been a fundamental problem of disturbed computing. Various schemes, most involving encryption of some sort have been devised to circumvent this problem. Typically, data to be securely transmitted between one computer and a remote computer is encrypted before transmission to the remote computer using an encryption algorithm, such as public key encryption. Additionally, it is common for a message authentication code to be generated for the data so that a remote computer can confirm the data received and unencrypted is correct.

However, while the data might be secure during the actual transmission of the data between the two computers, any software-to-software solution has a fundamental weakness; the human-to-computer interface. Regardless of how secure the endpoint or remote computer is; regardless of the strength of the encryption algorithm; the sensitive information must somehow be transferred on to the computer before it can be transported across the network.

This weakness can be exploited by looking for sensitive information when a user types the sensitive information into an application, such as when a user fills out a form on a web page while using a web browser. Viral programs can monitor keyboard inputs made to a web browser or other application, attempting to collect sensitive information like a user's credit card number and related information.

Additionally, viral programs can also monitor data passed out of applications that the viral program suspects may contain sensitive information. For example, even if a viral program does not collect information a user inputs into an application, for example the user's sensitive information is gathered by the application itself, the viral program can collect information at it is passed out of the application. If the application is a web browser, the viral program could collect http requests made by the web browser, before the data is encrypted in the hopes of obtaining sensitive information belonging to the user, such as his or her credit card number and related information.

SUMMARY OF THE INVENTION

It is an object of the present invention to provide a method and apparatus that overcomes problems in the prior art.

In a first aspect of the invention, a method of securely transmitting sensitive information to a remote device at the request of an application program and a computer readable memory having recorded thereon statements and instructions for execution by a data processing system to carry out the method are provided. The method comprises: generating a request, with the application program, to a secure channel provider to make a transmission to a remote device; passing a first message from the application program to the secure channel provider, the first message containing insertion point codes indicating locations within the first message where the sensitive information should be inserted, when the secure channel provider receives the first message; obtaining the sensitive information from a source outside of the application program; inserting the sensitive information into the first message at the locations in the first message indicated by the insertion point codes to form a second message containing the sensitive information; encrypting the second message to form an encrypted unit; and transmitting the encrypted unit to the remote device. The sensitive information is unaccessed by the application program during the execution of the method.

In a second aspect of the invention, a method of securely transmitting sensitive information to a remote device at the request of an application program is provided. The method comprises: generating a request to transmit data and a first message, with the application program located on a data processing system, to a secure channel provider located on the data processing system, to make a transmission to a remote device; inserting insertion point codes in the first message, the insertion point codes indicating locations within the first message where sensitive information should be inserted; passing the first message to the secure channel provider; passing the first message to a cryptographic service provider located on a peripheral device; in response to the cryptographic service provider receiving the first message, obtaining the sensitive information from a card reader on the peripheral device and inserting the sensitive information into the first message at the locations in the first message indicated by the insertion point codes to form a second message containing the sensitive information and determining a message authentication code for the second message; passing the message authentication code from the cryptographic service provider to the secure channel provider; in response to the secure channel provider receiving the message authentication code, appending the message authentication codes to the first message to form a first unit containing the first message and the message authentication code; passing the first unit to the cryptographic service provider; in response to the cryptographic service provider receiving the first unit, obtaining the sensitive information, inserting the sensitive information into the second message contained in the first unit at the locations in the data indicated by the insertion point codes to form the second message containing the sensitive information and forming a second unit containing the second message and the message authentication code before encrypting the second unit containing the sensitive information to form an encrypted unit; passing the encrypted unit to the secure channel provider; and in response to the secure channel provider receiving the encrypted unit, transmitting the encrypted unit to the remote device. Only the cryptographic service provider has access to the sensitive information in an unencrypted from during the execution of the method.

In a third aspect of the invention, a data processing system securely transmitting sensitive information to a remote device at the request of an application program is provided. The data processing system comprises: at least one processing unit; at least one memory storage device operatively coupled to the processing unit; and a program module stored in the at least one memory storage device operative for providing instructions to the at least one processing unit, the at least one processing unit responsive to the instructions of the program module. The program module operative for: invoking an application program and a secure channel provider; generating a request with the application program, to the secure channel provider to make a transmission to a remote device; passing a first message from the application program to the secure channel provider, the first message containing insertion point codes indicating locations within the first message where the sensitive information should be inserted when the secure channel provider receives the first message; obtaining the sensitive information from a source outside of the application program; inserting the sensitive information into the first message at the locations in the first message indicated by the insertion point codes to form a second message containing the sensitive information; encrypting the second message to form an encrypted unit; and transmitting the encrypted unit to the remote device with the secure channel provider. The sensitive information is unaccessed by the application program during the execution of the method.

In a fourth aspect of the invention, a system for securely transmitting sensitive information to a remote device at the request of an application program is provided. The system comprises: a peripheral device operative to receive input containing the sensitive information; and a data processing system, operatively coupled to the peripheral device and operative to receive data from the peripheral device. The data processing system having: at least one processing unit; at least one memory storage device operatively coupled to the processing unit; and a program module stored in the at least one memory storage device operative for providing instructions to the at least one processing unit, the at least one processing unit responsive to the instructions of the program module. The program module operative for: invoking an application program and a secure channel provider; generating a request with the application program, to the secure channel provider to make a transmission to a remote device; passing a first message from the application program to the secure channel provider, the first message containing insertion point codes indicating locations within the first message where the sensitive information should be inserted when the secure channel provider receives the first message; transmitting the first message to the periphery device; in response to receiving an encrypted unit from the periphery device, transmitting the encrypted unit to the remote device. The periphery device is operative for: invoking a cryptographic service provider; in response to receiving the second message from the data processing system; obtaining the sensitive information from a source; inserting the sensitive information into the first message at the locations in the first message indicated by the insertion point codes to form a second message containing the sensitive information; encrypting the second message to form an encrypted unit; and transmitting the encrypted unit to data processing system. The sensitive information is unaccessed by the application program during the execution of the method.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention as defined by the appended claims.

DETAILED DESCRIPTION OF THE EMBODIMENTS

The methods and apparatuses provided in accordance with the present invention allow a means of dynamically inserting sensitive information into a data stream during the encryption process so that sensitive information cannot be stolen from the stream. It also provides provisions for generating a message authentication code (MAC) containing the sensitive information without making the sensitive information available.

Figure 1:
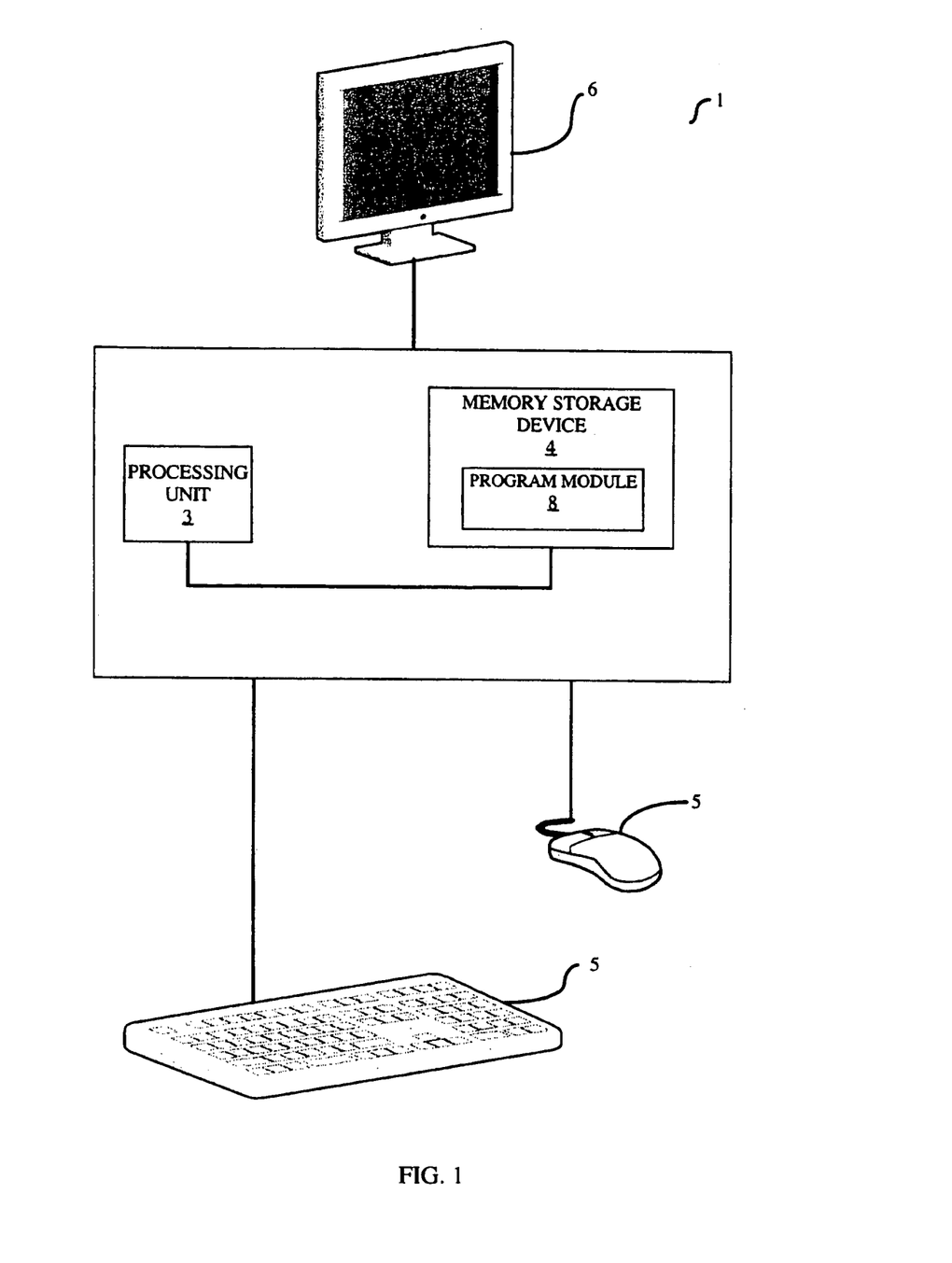
FIG. 1 is schematic illustration of a conventional data processing system, in accordance with an embodiment of the present invention.

FIG. 1 illustrates a data processing system 1 suitable for supporting the operation of methods in accordance with the present invention. The data processing system 1 typically comprises: at least one processing unit 3; a memory storage device 4; at least one input device 5; a display device 6 and a program module 8.

The processing unit 3 can be any processor that is typically known in the art with the capacity to run the program and is operatively coupled to the memory storage device 4 through a system bus. In some circumstances the data processing system 1 may contain more than one processing unit 3. The memory storage device 4 is operative to store data and can be any storage device that is known in the art, such as a local hard-disk, etc. and can include local memory employed during actual execution of the program code, bulk storage, and cache memories for providing temporary storage. Additionally, the memory storage device 4 can be a database that is external to the data processing system 1 but operatively coupled to the data processing system 1.

The input device 5 can be any suitable device suitable for inputting data into the data processing system 1, such as a keyboard, mouse or data port such as a network connection and is operatively coupled to the processing unit 3 and operative to allow the processing unit 3 to receive information from the input device 5. The display device 6 is a CRT, LCD monitor, etc. operatively coupled to the data processing system 1 and operative to display information. The display device 6 could be a stand-alone screen or if the data processing system 1 is a mobile device, the display device 6 could be integrated into a casing containing the processing unit 3 and the memory storage device 4.

The program module 8 is stored in the memory storage device 4 and operative to provide instructions to processing unit 3 and the processing unit 3 is responsive to the instructions from the program module 8.

Although other internal components of the data processing system 1 are not illustrated, it will be understood by those of ordinary skill in the art that only the components of the data processing system 1 necessary for an understanding of the present invention are illustrated and that many more components and interconnections between them are well known and can be used.

Figure 2:
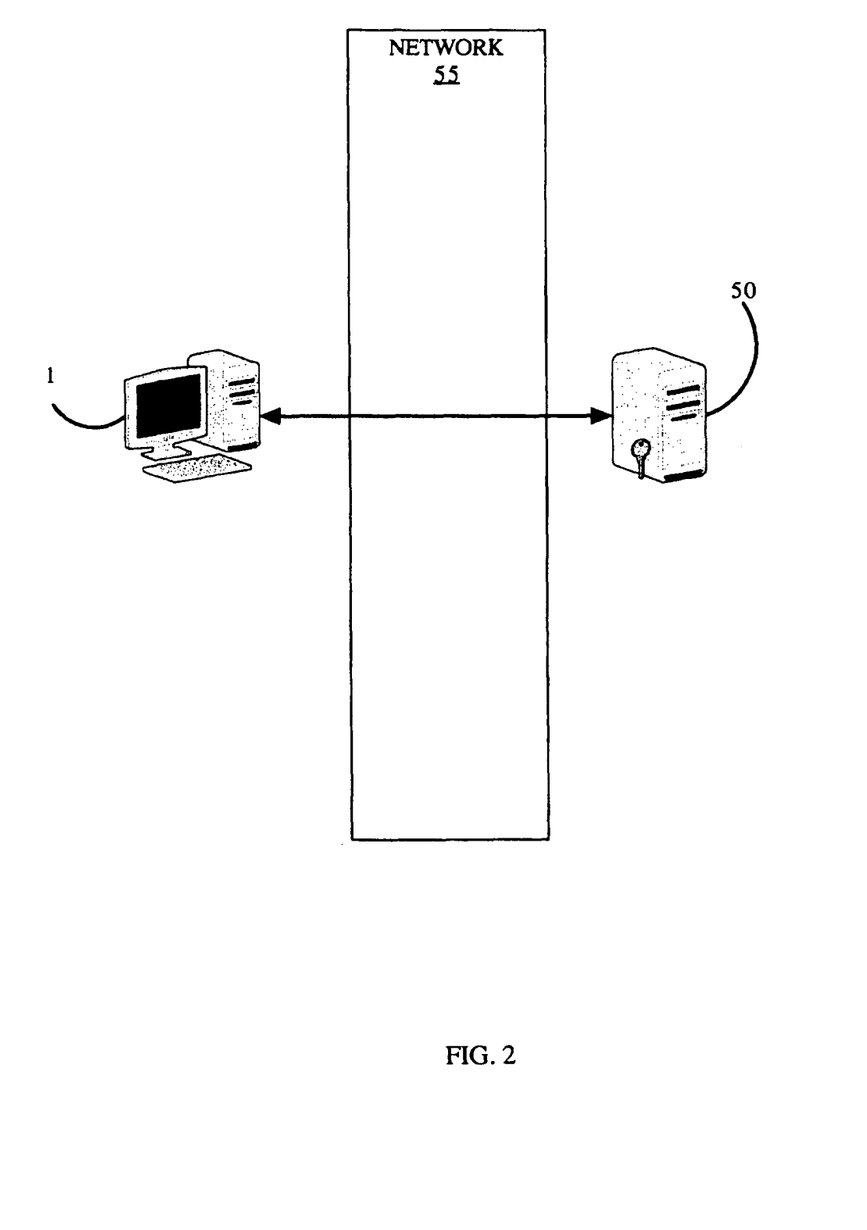
FIG. 2 is a schematic illustration of a first network configuration in accordance with an embodiment of the present invention.

FIG. 2 illustrates a network configuration wherein the data processing system 1 is connected over a network 55, such as the internet, to a remote device 50, such as a web server. The remote device 50 could be web server operating as an online retailer through a set of web pages or any other entity that the user of the data processing system 1 wishes to securely transmit sensitive information to.

Furthermore, the invention can take the form of a computer readable medium having recorded thereon statements and instructions for execution by a data processing system 1. For the purposes of this description, a computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 3:
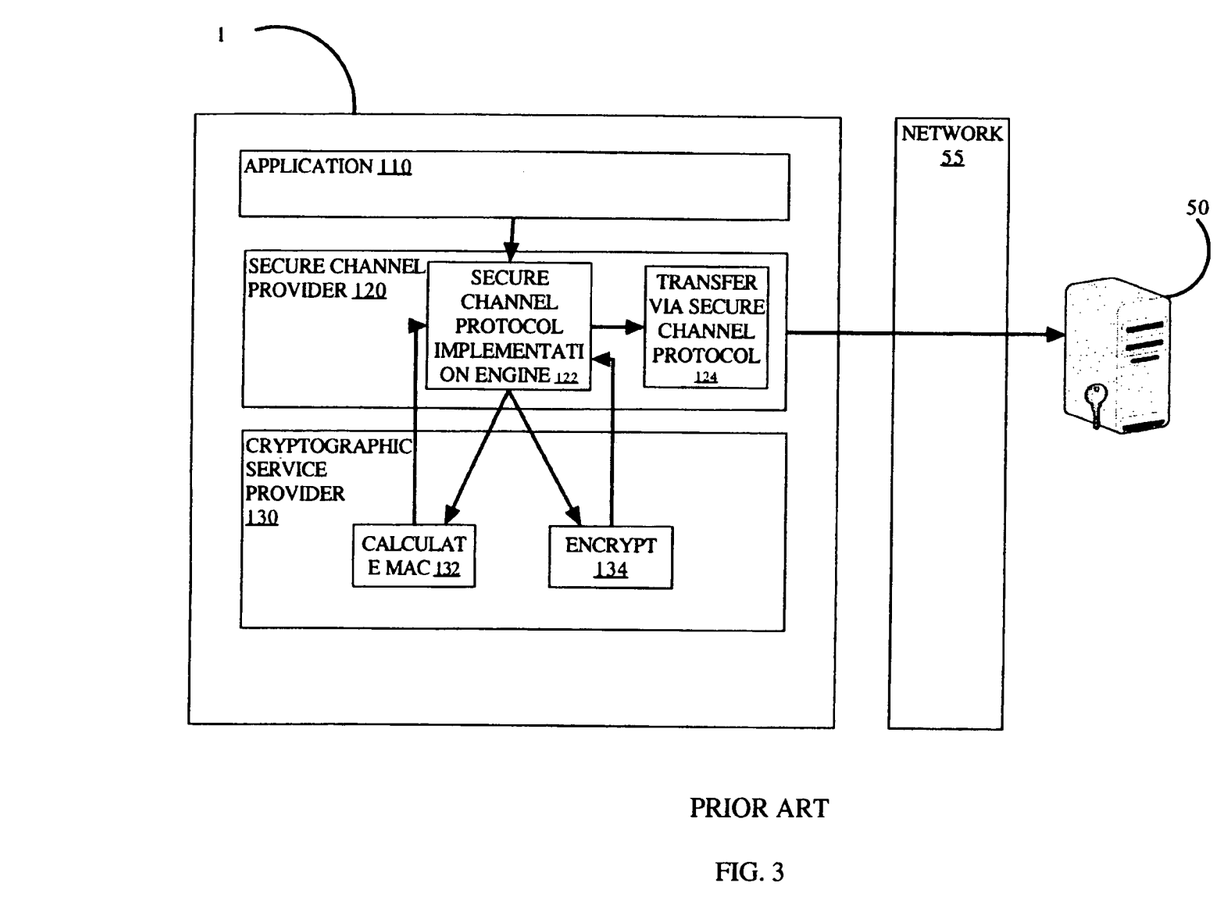
FIG. 3 is a flowchart illustrating a conventional method of securely transmitting data to a remote device in accordance with an embodiment of the present invention.

FIG. 3 illustrates a flowchart of a conventional method of encrypting data to be transmitted to a remote device 50. In this conventional method, sensitive information is encrypted and transmitted to the remote device 50. Sensitive information can be any type of information that a user would like to protect. For example, when a user is transmitting his or her credit card number over the internet to a remote server, the user would like the transmission of his or her credit card information to be transmitted in a secured fashion so that the data is protected from interception by a third party as it is being transmitted to the server, so that the user does not have to worry about the third party obtaining his or her credit card information. This sensitive information could also be personal information, such as the user's contact information, or any information that a user does not want to be potentially seen by a third party.

An application 110 has data containing sensitive information that the application 110 would like to transmit to the remote device 50 over a secure connection. Typically, the application 110 would be a web browser and the data would be transmitted by a HTTP request (rather than being simply applicable to HTML, the present invention could be equally applicable to other types of applications such as XML, SOAP, etc.). The user would input the information to be transmitted, including the sensitive information, to the data processing system 1 and directly to the application 110, such as by the user filling in a form or text box on the web page they are accessing using the web browser.

Referring to FIG. 1, the user typically inputs information into the data processing system 1, running the application 110, by the means of an input device 5 such as a keyboard. For example, the user may wish to transmit his or her credit card number to the remote device 50, in order to make an online purchase. The user types his or her credit card information into the form provided by the web page using the input device 5. The application 110 then gathers this information inputted by the user and bundles it as the data to be transmitted in the HTTP request to the secure channel provider 120.

Alternatively, the information may be stored in the memory of the data storage device 4 and at the prompting of the user, the application 110 collects the sensitive information from the memory storage device 4 and bundles the sensitive information in a message to be transmitted to the remote device 50. The application 110 takes the data and bundles it into the body of the HTTP request as a message and passes the message containing the sensitive information to a secure channel provider 120. The secure channel provider 120 is a system operative to provide a secure connection to the remote server 50 and is typically a secure socket layer (SSL), transport layer security (TLS) or other set of software services that are capable of providing secured transmissions.

The secure channel provider 120 establishes a connection to the remote device 50 and prepares the message for transmittal.

The a secure channel protocol implementation engine 122 of the secure channel provider 120 prepares the message for transmission by having the message encrypted for transmission as well as adding a message authentication tag to the data. The secure channel protocol implementation engine 122 passes the message containing the sensitive information, to be transmitted to the remote device 50, to the cryptographic service provider 130. First, the secure channel protocol implementation engine 122 passes the message to the cryptographic service provider 130, along with a secret key, to determine a message authentication code (MAC or tag) at step 132 for the data to be appended to the message. The MAC allows the remote device 50 to authenticate the message when it has received and decrypted the message.

After the cryptographic service provider 130 determines a MAC for the message at step 132, the cryptographic service provider 130 passes the MAC back to the secure channel provider 120 and the secure channel protocol implementation engine 122 appends the MAC to the message.

Next, the secure channel protocol implementation engine 122 passes the message and the appended MAC, out of the secure channel provider 120, and back to the cryptographic service provider 130 to be encrypted at step 134. The cryptographic service provider 130 encrypts the message and the appended MAC into an encrypted unit, at step 134, and returns the encrypted unit to the secure channel provider 120 and the secure channel protocol implementation engine 122, where the encrypted unit is passed to a transfer via secure channel protocol 124 that adds a header to the encrypted unit and transmits the encrypted unit to the remote device 50.

Upon receiving the encrypted unit, the remote device 50 decrypts the encrypted unit and uses the MAC to authenticate the data.

Figure 4:
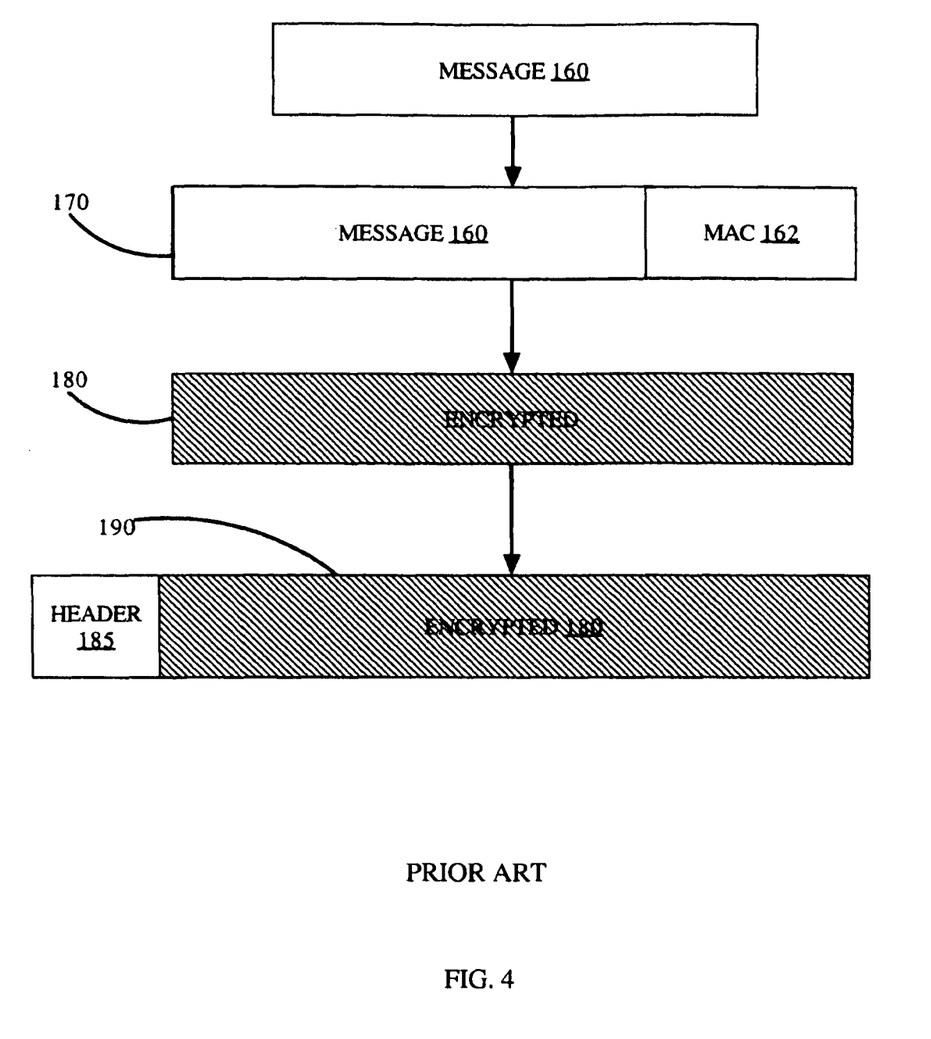
FIG. 4 is an illustration of the alteration of the data by the method illustrated in the flowchart of FIG. 3 to prepare the data for transmission to the remote device.

FIG. 4 illustrates how the data is altered in the conventional method illustrated by the flowchart in FIG. 3, to prepare it for transmittal to the remote device 50. Referring to FIGS. 3 and 4, the application 110 makes the request for a secure transmission of data and passes the message 160 to the secure channel provider 120. At this point, the message 160 is unencrypted. The secure channel provider 120 passes the message 160 to the cryptographic service provider 130 where a MAC 162 is determined for the data 160 and the MAC 162 is passed back to the secure channel provider 120 where the secure channel provider 120 appends the MAC 126 to the message 160, to form a message unit 170.

The secure channel provider 120 then passes the message unit 170 back to the cryptographic service provider 130 where the message unit 170 is encrypted and an encrypted unit 180 is passed back to the secure channel provider 120, where a header 185 is appended to the encrypted unit 180 forming a data packet 190 which is then transmitted to the remote device 50.

While this method may protect a user from third parties that intercept the data packet 190 from obtaining the sensitive information, it can have security flaws. Specifically, if a viral program is monitoring inputs to the application 110 or outputs of the application 110, the sensitive information can be accessible in an unencrypted state, either when a user inputs the sensitive information to the application 110 or when the application transfers the message containing the sensitive information to the secure channel provider 120.

Figure 5:
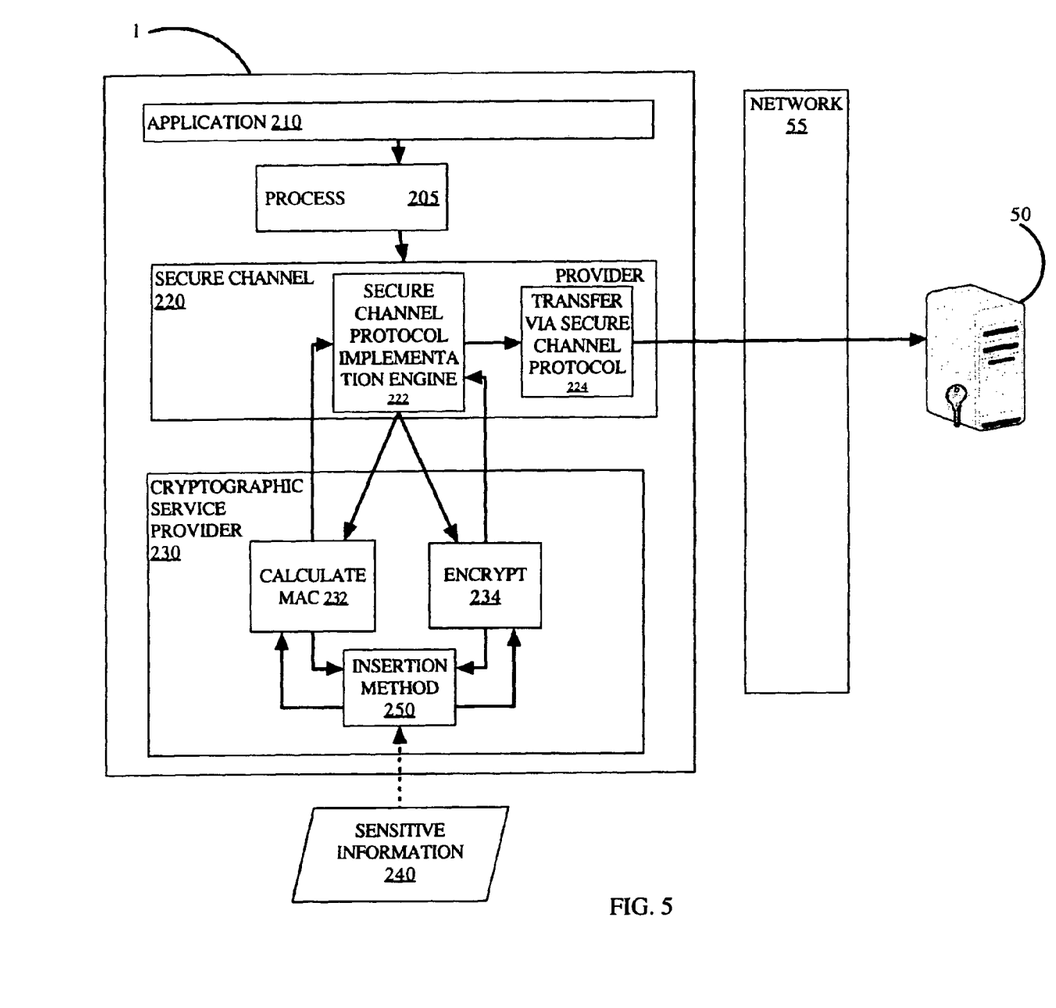
FIG. 5 is a flowchart illustrating a method of securely transmitting data to a remote device in accordance with an embodiment of the present invention.

FIG. 5 is a flowchart of a method of encrypting data to be transmitted to a remote device 50, in accordance with the present invention. Rather than allowing an application 210 access to sensitive information, the application 210 and a secure channel provider 220 essentially never have access to the sensitive information in an unencrypted form, so that any data passed to or from the application 210 and secure channel provider 220 that is intercepted by a viral program will likely not result in a third party obtaining the sensitive information.

The application 210 has sensitive information that the application 210 would like to transmit to the remote device 50 over a secure connection. Typically, if the application 210 is a web browser, the application 210 generates an HTTP request to be transmitted to the remote device 50.

Rather than having the user input the sensitive information into the data processing system 1 through the application 210 directly, the application 210 generates a first message without inserting the sensitive information into the message.

For example, if the application 210 is a web browser accessing a web page that requests a user's credit card number, rather than having the user enters his or her credit card number into the application 210, the application 210 will assemble the first message with the sensitive information in the form of the credit card number and related information absent.

Before the first message is passed to a secure channel provider 220, a process 205 intercepts the first message and inserts insertion point codes (IPCs) into the first message to indicate where sensitive information is expected to be in the first message by the remote device 50. Additionally, the process 205 can optionally insert padding elements into the first message to allow varying lengths of sensitive information to be added to the first message without affecting the length of the first message.

Alternatively, rather than the process 205 inserting the IPC codes into the first message after it passes out of the application 210, in some embodiments of the present invention, the application 210 may insert the IPC codes while generating the first message for the request, such as by the application 210 containing the process 205 to insert the IPC codes, or alternatively, if the application 210 is a web browser accessing a web page, the web page could either already contain the IPCs or generate the IPCs.

The first message, containing the inserted IPCs, is then passed to the secure channel provider 220.

The secure channel provider 220 establishes a secure connection to the remote device 50 and a secure channel protocol implementation engine 222 deals with determining a message authentication code (or MAC) for the message and having the message encrypted before transmission. The a secure channel protocol implementation engine 222 passes the first message, containing the IPCs, to the cryptographic service provider 230 to have a MAC generated at step 232.

Rather than the cryptographic service provider 230 generating a MAC for the first message with the IPCs contained within, the first message is passed to an insertion method 250, with access to the sensitive information, and the sensitive information is inserted in the first message, by replacing the IPC codes with the sensitive information, to form a second message containing the sensitive information. Additionally, if padding elements was inserted by the process 205, the padding elements may be adjusted if the sensitive information is of such a length that it is needed to maintain an identical buffer length. For example, if a name is part of the sensitive information, padding elements can be removed for names that are longer than expected.

If the message is fragmented into a number of smaller units for transmission, the padding can be used to place a portion of the sensitive information all in one fragment, if the message is broken up in an IPC.

A MAC for the second message containing the sensitive information is determined at step 232 and the MAC passed back to the secure channel provider.

When the MAC is determined, the MAC is passed back to the secure channel provider 220. The MAC that was determined for the second message with the sensitive information inserted is returned. The second message, however, is not passed back to the secure channel provider 220.

The secure channel provider 220 appends the MAC, received from the cryptographic service provider 230, to the first message containing the IPCs, to form a first unit and the first unit containing the first message with the IPCs inserted and the appended MAC is passed back to the cryptographic service provider 230 to encrypt the first unit.

When the cryptographic service provider 230 receives the first unit containing the first message with the IPC codes inserted and the MAC determined for the second message with the sensitive information added, rather than encrypting this first unit, the first unit is passed to the insertion method 250. The insertion method 250 obtains the sensitive information from a source 240 outside the application program 210 and inserts the sensitive information into the first message in the first unit, using the IPCs to indicate where the sensitive information should be inserted forming a second unit containing the second message and the appended MAC. This second unit is then encrypted by the cryptographic service provider 230, at step 234, to form an encrypted unit from the second unit, with the second message containing the sensitive information and the appended MAC encrypted at step 234.

The source 240 can be the memory storage device 4 of the data processing system 1, a user's input through a keyboard or from another program other than the application program 210

The encrypted unit is then passed back to the secure channel protocol implementation engine 222 in the secure channel provider 220 and passed to a transfer via secure channel protocol 224 where a header is attached to the encrypted unit to form a data packet and the data packet is transmitted to the remote device 50.

Figure 6:
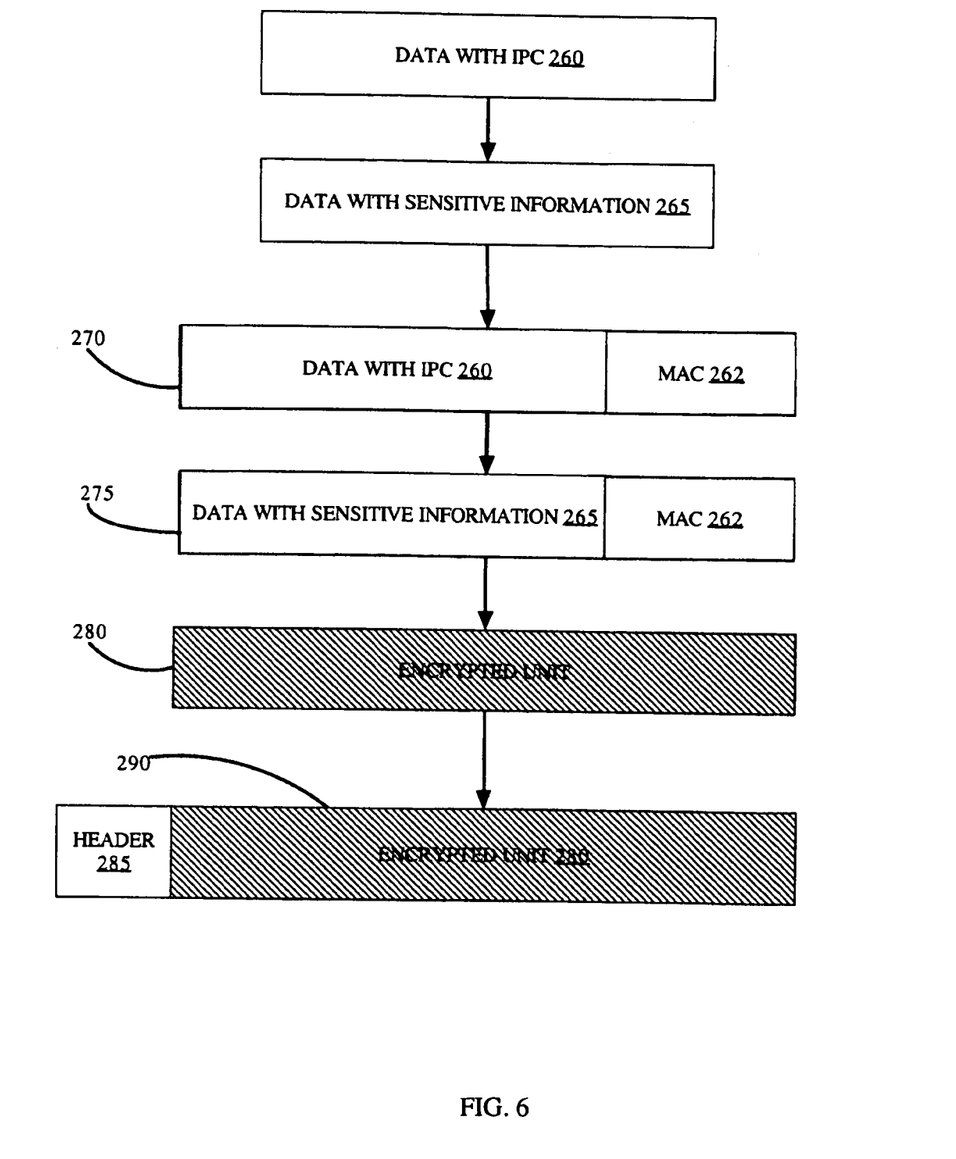
FIG. 6 is an illustration of the alteration of the data by the method illustrated in the flowchart of FIG. 5 to prepare the data for transmission to the remote device.

FIG. 6 illustrates a how the data is altered to prepare it for transmittal in accordance with the present invention. Referring to FIGS. 5 and 6, the application 210 passes a first message 260 containing IPCs rather than the sensitive information to the secure channel provider 220. The secure channel provider 220 passes the first message 260 to the cryptographic service provider 230. The cryptographic service provider 230 uses the insertion method 250 to insert the sensitive information into the first message 260 resulting in a second message 265, containing the sensitive information. The second message 265 containing the sensitive information is used by the cryptographic service provider 230 to determine a MAC 262. The MAC 262, alone, is passed to the secure channel provider 220 and the MAC 262 is appended to the first message 260, containing the IPCs, to form a first unit 270, containing the first message 260 with the IPCs inserted and the MAC 262 determined for the second message 265.

This first unit 270 is passed from the secure channel provider 220 to the cryptographic service provider 230 where the cryptographic service provider 230 uses the insertion method 250 to insert the sensitive information into the first message 260, containing the IPCs, to result in the second message 265, containing the sensitive information, in addition to the MAC 262, together forming a second unit 275. This second unit 275 is then encrypted by the cryptographic service provider 230 to form an encrypted unit 280 which is passed back to the secure channel provider 220. At this point, although the secure channel provider 220 has access to the encrypted unit 280 that contains the second message 265 with the sensitive information, the second message is in an encrypted form and the secure channel provider 220 or the application 210 have never had access to the second message 265, containing the sensitive information, when it is not in an encrypted form.

The secure channel provider 220 adds a header 285 to the encrypted unit 280 to form a data packet 290 and the data packet 290 is then ready to be transmitted to the remote unit 50.

In this manner, the application 210 and the secure channel provider 220 are provided with access to the sensitive information in an unencrypted state. Viral programs resident on the data processing system 1 that are monitoring, either keyboard inputs or data passed out of the application 210, attempting to grab sensitive information, will not be able grab the sensitive information because the application 210 and the service channel provider 220 never have the sensitive information in an unencrypted state.

The embodiment of the method illustrated in FIG. 5 has the application 210, secure channel provider 220 and cryptographic service provider 230 all resident on the data processing system 1. The sensitive information can be made accessible to the insertion method 250 by having the sensitive information stored on a storage device 4, either encrypted or unencrypted, so that insertion method 250 accesses the sensitive information when requested, or alternatively, a user could input the sensitive information manually into the data processing system 1 at the prompting of the insertion method 250 or through other input means, like a peripheral device, that inputs the information to the data processing system 1.

Figure 7:
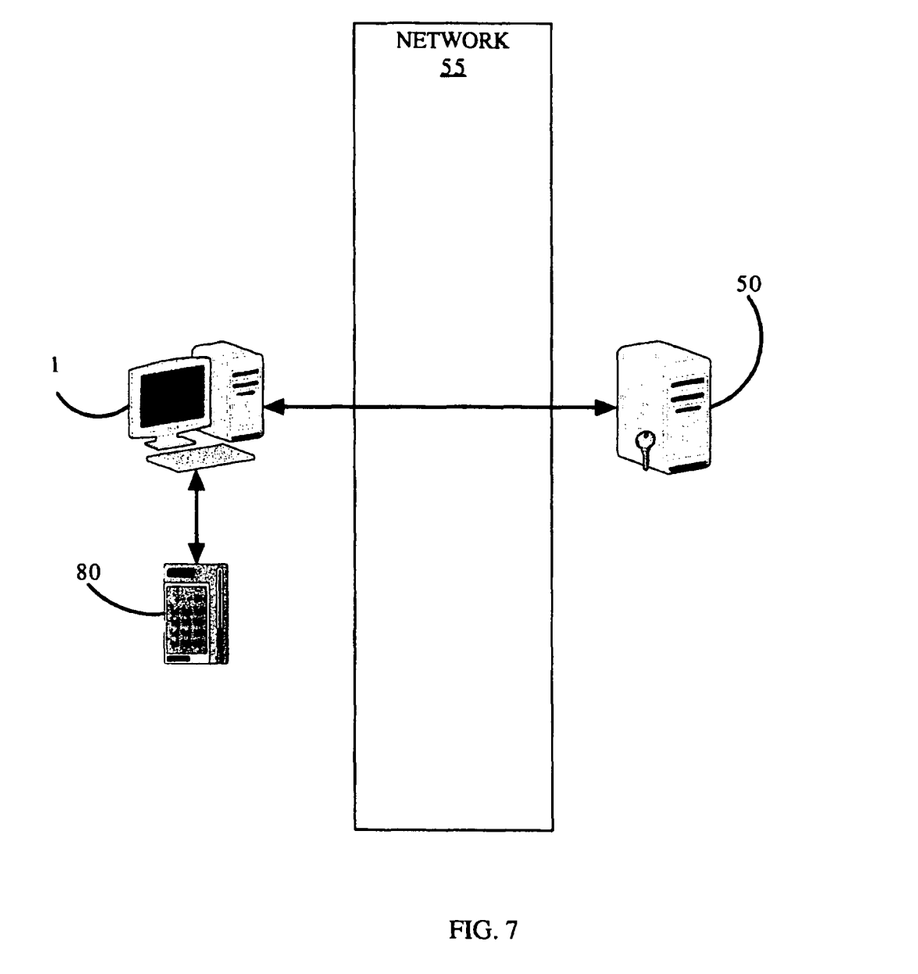
FIG. 7 is a schematic illustration of a network configuration in accordance with an embodiment of the present invention.

FIG. 7 illustrates another embodiment of the present invention wherein a data processing system I operatively coupled to a peripheral device 80. Typically the peripheral device 80 contains a card reader, key pad, or other system allowing information to be input to the peripheral device 80. The peripheral device 80 could also be magnetic stripe reader, smart/ship card reader, contactless/RFID reader, USB storage device, USB portable application enabled device, optical drive, cellular phone, blackberry, etc. For example, if the sensitive information is credit card information, the peripheral device 80 could be a card reader and the sensitive information to be transmitted could be obtained by a user swiping their credit card in the peripheral device 80. Alternatively, the peripheral device 80 could be a memory device, such as a USB key or optical drive, and sensitive information relating to a user could be stored in memory on the peripheral device 80.

In an embodiment of the present invention, the data processing system I and peripheral device 80 shown in FIG. 7 could be used such that the sensitive information 240, as shown in FIG. 5, is obtained from the peripheral device 80. The sensitive information 240 is passed from the peripheral device 80 to the cryptographic service provider 230 resident on the data processing system 1, where the sensitive information is then inserted using the insertion method 250 into the first message. The sensitive information 240 could be passed unencrypted from the peripheral device 80 to the data processing system. In an alternative embodiment of the present invention, the peripheral device 80 could encrypt the sensitive information before passing it to the cryptographic service provider 230 on the data processing system I. The cryptographic service provider 230 would then decrypt the sensitive information as part of the insertion method 250 before the unencrypted sensitive information is inserted in the first message using the insertion method 250.

Figure 8:
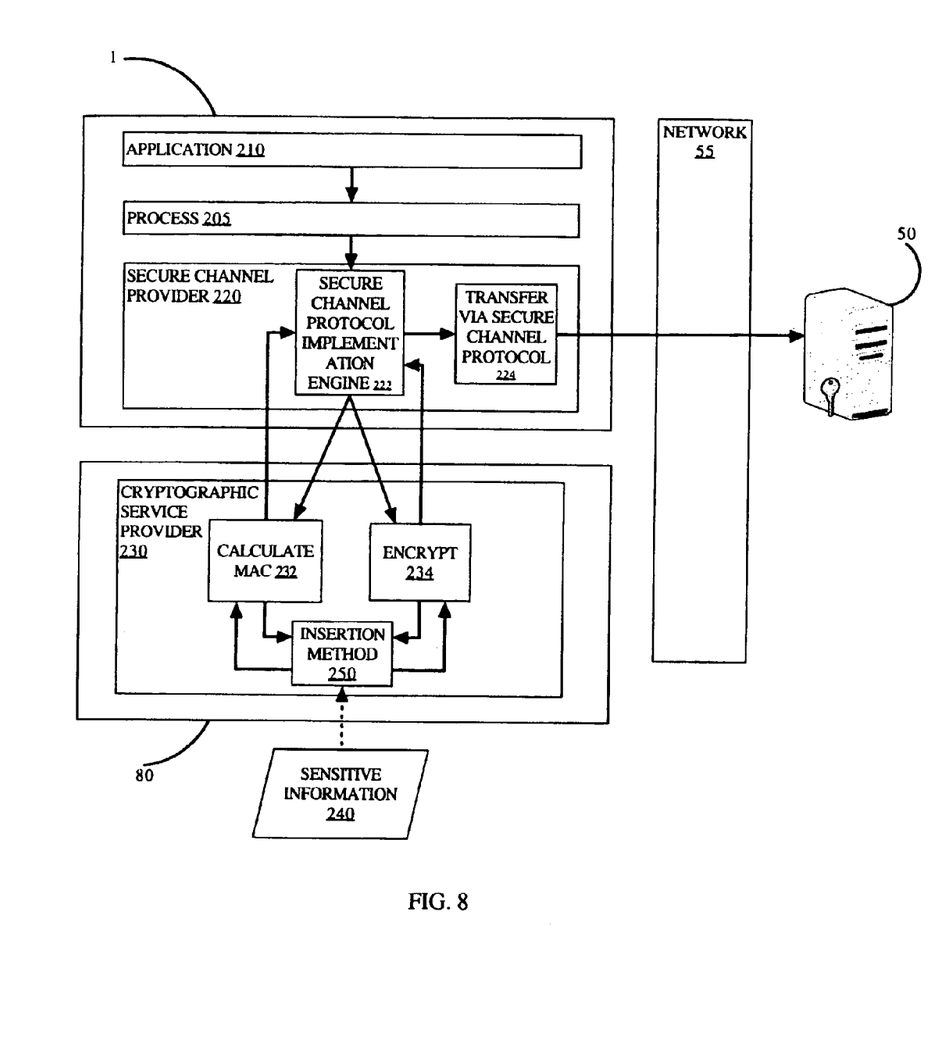
FIG. 8 is a flowchart illustrating a method of securely transmitting data to a remote device in accordance with an embodiment of the present invention.

FIG. 8 illustrates an alternative embodiment of a method of encrypting data to be transmitted to a remote device 50, using the data processing system 1 and peripheral device 80, in accordance with the present invention. The method illustrated in FIG. 8 is similar to the method illustrated in FIG. 5; however, the cryptographic service provider 230 is resident on the peripheral device 80. The connection between the data processing system I could be an unsecured connection, such as a USB, serial or other direct connection, if the peripheral device 80 and the data processing system I are not connected through a network or alternatively, if the connection between the data processing system I and the peripheral device 80 is accessible by outside sources, the connection between the data processing system I and the peripheral device 80 could be a separate secure connection.

When a first message containing IPCs is passed to the secure channel 220, the secure channel protocol implementation engine 222 of the secure channel 220 passes the first message with the IPCs to the cryptographic service provider 230 by passing the first message from the data processing system 1 to the peripheral device 80, such as by a USB connection, etc. The cryptographic service provider 230 uses the insertion method 250 to obtain the sensitive information from a source 240 and insert the sensitive information into the first message in the locations indicated by the IPCs, forming a second message containing the sensitive information. The cryptographic service provider 230 then determines a MAC for the second message containing the sensitive information, at step 232.

Typically, the source 240, in this embodiment is a card reader, RFID tag reader or keyboard located on the periphery device 80.

The cryptographic service provider 230 passes the MAC determined for the second message, containing the sensitive information, back to the secure channel provider 220; passing the MAC, alone, from the peripheral device 80 to the data processing unit 1. The cryptographic service provider 230 appends the MAC to the first message, containing the IPC codes, that the secure channel provider 220 has access to, forming a first unit containing the first message and the appended MAC.

The secure channel provider 220 passes the first unit to the cryptographic service provider 230; passing the unit from the data processing unit 1 to the peripheral device 80. The cryptographic service provider 230 uses the insertion method 250 to add the sensitive information to the first message, contained in the first unit, at the locations indicated by the IPCs to from a second unit containing the second message and the MAC and encrypts this second unit to form an encrypted unit.

The encrypted unit is passed back to the secure channel provider 220, passing it from the peripheral device 80 to the data processing system 1, before placing a header on the encrypted data in a transfer via secure channel protocol 224 and transmitting the encrypted unit to the remote device 50.

In this manner, not only do the application 210 and the secure channel provider 220 never have access to the sensitive information in an unencrypted state, but the sensitive information never exists on the data processing system 1 in an unencrypted state. Rather, the sensitive information only exists in an unencrypted form on the peripheral device 80. This peripheral device 80 is typically a card reader, key pad or combination, but can be any peripheral device 80 that can implement the cryptographic service provider 230 and insertion method 250 and has access to the sensitive information, for example the peripheral device 80 could be a separate computer.

Additionally, to further prevent any change of viral programs, the peripheral device 80 could be based on an entirely hardware device with embedded code.

Additionally, although the diagram of FIG. 8 illustrates the cryptographic service provider 230 alone is resident on the peripheral device 80, it is contemplated that secure service provider 220 and cryptographic service provider 230 could be both resident on the peripheral device 80 without departing from the spirit or scope of the present invention.

Figure 9:
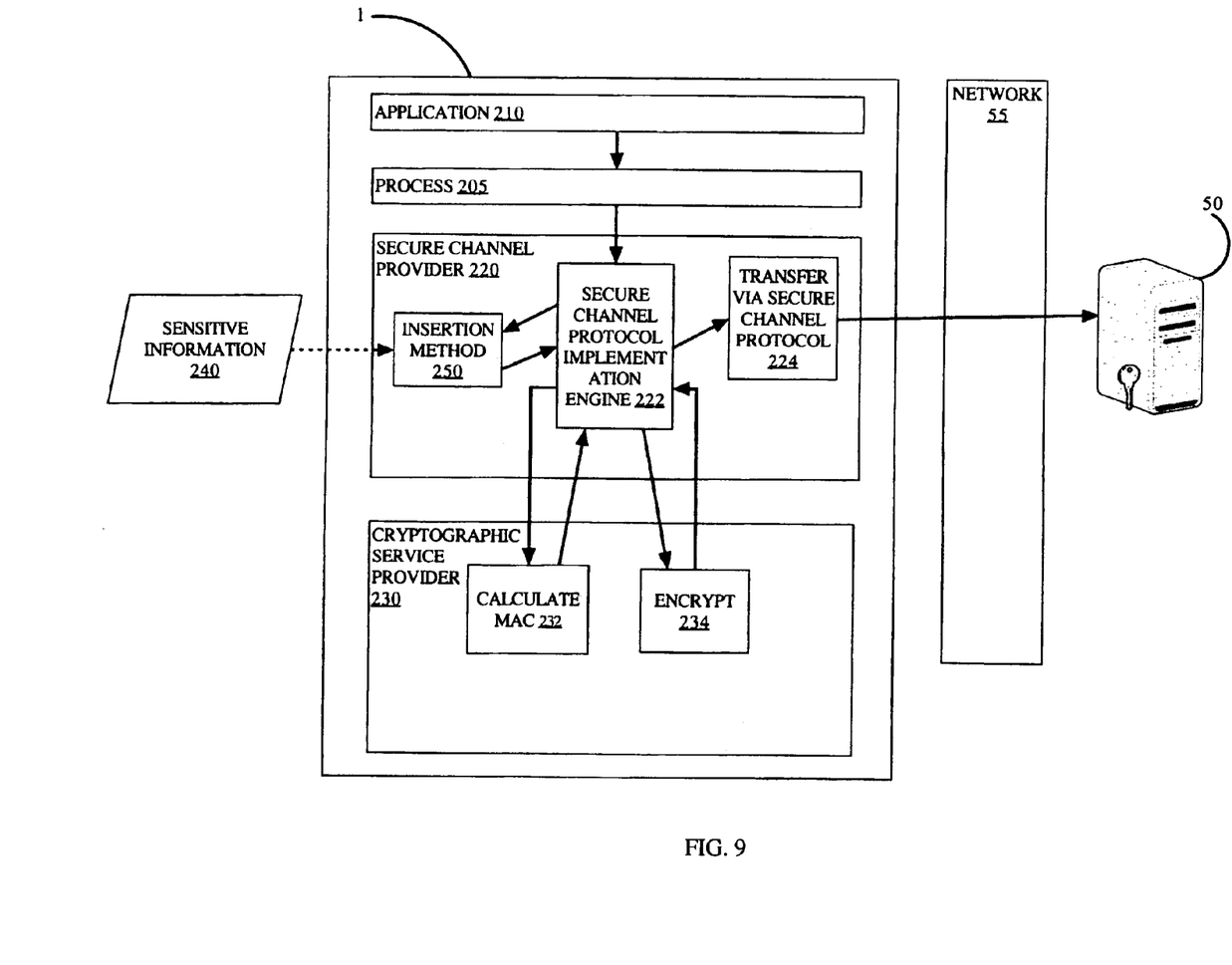
FIG. 9 is a flowchart illustrating a method of securely transmitting data to a remote device in accordance with an embodiment of the present invention.

FIG. 9 illustrates a method in accordance with an alternative embodiment of the present invention wherein sensitive information is inserted in the first message at the secure channel provider 220 to form a second message.

According to the embodiment of this method of the present invention, rather than the cryptographic service provider 230 calling an insertion method 250 to have the sensitive information inserted in the first message, containing IPCs, to form a second message, containing the sensitive information, after the first message is passed to the secure channel provider 220, the secure channel protocol implementation engine 222 calls an insertion method 250 to insert the sensitive information in the first message, using the IPCs as guides, and forming a second message. The secure channel protocol implementation engine 222 passes the second message containing the sensitive information to the cryptographic service provider 230 where a MAC is calculated for the second message at step 232 and then the second message, containing the sensitive information is encrypted to form an encrypted unit, at step 234, before a header is added to the encrypted unit to form a data packet and the data packet transmitted to the remote device 50.

Figure 10:
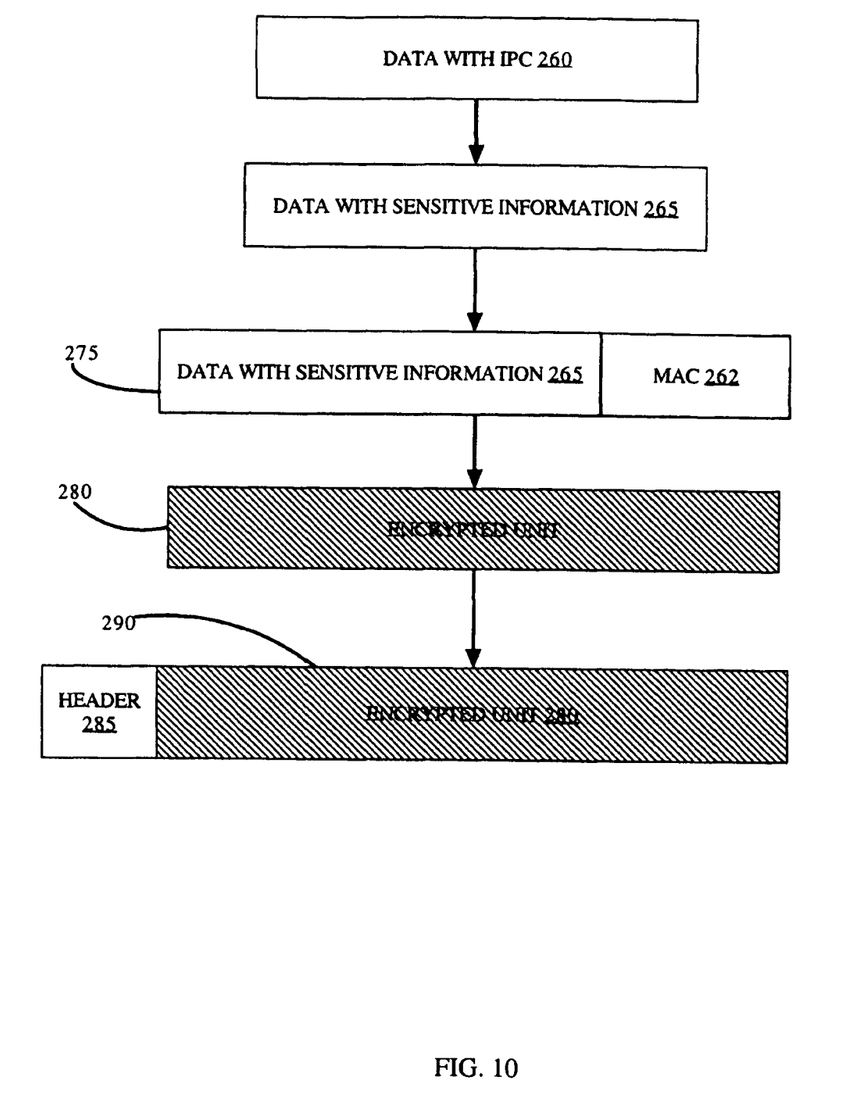
FIG. 10 is an illustration of the alteration of the data by the method illustrated in the flowchart of FIG. 9 to prepare the data for transmission to the remote device.

FIG. 10 illustrates how the data is altered to prepare it for transmittal in accordance with an example embodiment of the present invention. Referring to FIGS. 9 and 10, the application 210 passes a first message 260, containing IPCs, rather than the sensitive information to the secure channel provider 220. The secure channel provider 220 calls the insertion method 250, which inserts the sensitive information into the first message, forming a second message 265 containing the sensitive information. The secure channel provider 220 passes the second message 265 containing the sensitive information to the cryptographic service provider 230 where a MAC 262 is calculated for the second message 265 containing the sensitive information.

The MAC 262 is appended to the second message 265, containing sensitive information, to form a unit 275 and the cryptographic service provider 230 then encrypts the unit 275 to from an encrypted unit 280. The secure service provider 220 then adds a header 285 to the encrypted unit 280 to from a data packet 290 and the data packet 290 is ready for transmission to the remote device 50.

In the method illustrated in FIG. 9 and 10, although the secure channel provider 220 has access to the sensitive information in an unencrypted state and may therefore not be as secure as the method illustrates in FIGS. 5 or 7, the application 210 still practically never has access to the sensitive information in an unencrypted state and therefore if viral programs intercept data entering or exiting the application 210, they will likely not have access to the sensitive information.

The foregoing is considered as illustrative only of the principles of the present invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A method of securely transmitting sensitive information to a remote device at the request of an application program, the method comprising:

generating a request, with the application program, to a secure channel provider to make a transmission to a remote device that includes the sensitive information, wherein the application program and the secure channel provider are resident on a single data processing device;

generating, by the application program, a first message for transmittal to the remote device;

generating, by the single data processing device, insertion point codes, the insertion point codes indicating locations within the first message where sensitive information should be inserted;

inserting, by the single data processing device, the insertion point codes in the first message;

passing the first message out of the application program to the secure channel provider;

obtaining the sensitive information from a source outside the application program;

inserting, by the single data processing device or a peripheral device directly connected to the single data processing device, the sensitive information into the first message at the locations in the first message indicated by the insertion point codes to form a second message containing the sensitive information;

encrypting the second message including the sensitive information to form an encrypted unit; and transmitting the encrypted unit to the remote device with the secure channel provider, wherein the sensitive information is unaccessed in an unencrypted form by the application program during execution of the method.

2. The method of claim 1, wherein the secure channel provider establishes a connection to the remote device and passes the first message to a cryptographic service provider, the sensitive information is inserted in the first message by the cryptographic service provider forming the second message and the cryptographic service provider encrypts the second message to form the encrypted unit before passing the encrypted unit to the secure channel provider to be transmitted to the remote device and wherein only the cryptographic service provider has access to the sensitive information in an unencrypted form.

3. The method of claim 2, wherein the secure channel provider passes the first message to the cryptographic service provider before the sensitive information is inserted into the first message to form the second message, and the cryptographic service provider inserts the sensitive information in the first message at the locations indicated by the insertion point codes to form the second message before calculating a message authentication code for the second message and passing the message authentication code to the secure channel provider before encrypting the second message and the message authentication code.

4. The method of claim 3, wherein the application program, the secure channel provider and the cryptographic service provider are located on the single data processing device.

5. The method of claim 3, wherein the cryptographic service provider is resident on the peripheral device and wherein the sensitive information is present on the single data processing device only in an encrypted form.

6. The method of claim 5, wherein the source is a card reader operative to read the sensitive information off of a card.

7. The method of claim 5, wherein the source is a RFID card and reader.

8. The method of claim 2, wherein the application program, secure channel provider and cryptographic service provider are resident on the single data processing device and the sensitive information is passed to the cryptographic service provider on the single data processing device from the peripheral device.

9. The method of claim 8, wherein the sensitive information is encrypted by the peripheral device before the encrypted sensitive information is passed to the cryptographic service provider on the single data processing device and wherein the cryptographic service provider decrypts the encrypted sensitive information before inserting it into the first message to form the second message.

10. The method of claim 1, wherein the sensitive information is inserted in the first message by the secure channel provider to form the second message before passing the second message to a cryptographic service provider where the second message is encrypted to form the encrypted unit and passing the encrypted unit to the secure channel provider to be transmitted to the remote device and wherein only the secure channel provider and the cryptographic service provider have access to the sensitive information in an unencrypted form.

11. The method of claim 10, further comprising the step of passing the second message to the cryptographic service provider to determine a message authentication code for the second message before encrypting the second message and the message authentication code and after the sensitive information is inserted in the first message to form the second message.

12. The method of claim 1, wherein the insertion point codes are inserted in the first message by the application program.

13. The method of claim 1, wherein the insertion point codes are inserted in the first message after the first message passes out of the application program and before the first message is passed to the secure channel provider.

14. The method of claim 1 wherein the first message and the second message have the same structure and length.

15. A method of securely transmitting sensitive information to a remote device at the request of an application program, the method comprising:
   generating a request to transmit data and a first message on a data processing device, with the application program located on the data processing device, to a secure channel provider located on the data processing device, to make a transmission to a remote device;
   generating, by the data processing device, insertion point codes, the insertion point codes indicating locations within the first message where sensitive information should be inserted;
   inserting, by the data processing device, the insertion point codes in the first message;
   passing the first message to the secure channel provider;
   passing the first message to a cryptographic service provider located on a peripheral device directly connected to the data processing device;
   in response to the cryptographic service provider receiving the first message, obtaining the sensitive information from a card reader on the peripheral device and inserting the sensitive information into the first message at the locations in the first message indicated by the insertion point codes to form a second message containing the sensitive information and determining a message authentication code for the second message;
   passing the message authentication code and not the second message from the cryptographic service provider to the secure channel provider on the data processing device;
   in response to the secure channel provider receiving the message authentication code, appending the message authentication codes to the first message to form a first unit containing the first message and the message authentication code;
   passing the first unit to the cryptographic service provider on the peripheral device;
   in response to the cryptographic service provider receiving the first unit, obtaining the sensitive information and inserting the sensitive information into the first message contained in the first unit at the locations in the first message indicated by the insertion point codes to form the second message containing the sensitive information and forming a second unit containing the second message and the message authentication code before encrypting the second unit containing the sensitive information to form an encrypted unit;
   passing the encrypted unit to the secure channel provider on the data processing device; and
   in response to the secure channel provider receiving the encrypted unit, transmitting the encrypted unit to the remote device from the data processing device,
   wherein only the cryptographic service provider has access to the sensitive information in an unencrypted form during the execution of the method.

16. The method of claim 15 wherein the first message and the second message have the same structure and length.

17. A data processing device for securely transmitting sensitive information to a remote device at the request of an application program, the data processing device comprising:
   at least one processing unit;

at least one memory storage device operatively coupled to the at least one processing unit; and a program module stored in the at least one memory storage device operative for providing instructions to the at least one processing unit, the at least one processing unit responsive to the instructions of the program module, the program module operative to:

invoke an application program and a secure channel provider running on the data processing device;

generate a request with the application program, to the secure channel provider, to make a transmission to a remote device;

generate a first message with the application program;

generate insertion point codes, the insertion point codes indicating locations within the first message where the sensitive information should be inserted when the secure channel provider receives the first message;

insert the insertion point codes in the first message;

pass the first message from the application program to the secure channel provider;

obtain the sensitive information from a source outside of the application program;

insert the sensitive information into the first message at the locations in the first message indicated by the insertion point codes to form a second message containing the sensitive information;

encrypt the second message to form an encrypted unit; and transmit the encrypted unit to the remote device with the secure channel provider, wherein the sensitive information is unaccessed by the application program in an unencrypted form during the operation of the program module.

18. The data processing device of claim 17, wherein the program module is further operative to: invoke a cryptographic service provider; and pass the first message to the cryptographic service provider so that the sensitive information is inserted in the sensitive message by the cryptographic service provider to form a second message and encrypting the second message to form the encrypted unit using the cryptographic service provider, wherein only the cryptographic service provider has access to the sensitive information in an unencrypted form.

19. The data processing device of claim 18, wherein the program module is further operative to: pass the first message to the cryptographic service provider before the sensitive information is inserted in the first message to form the second message; insert the sensitive information in the first message at the locations indicated to form the second message, using the cryptographic service provider, before calculating a message authentication code for the second message and passing the message authentication code from the cryptographic service provider to the secure channel provider; in response to the secure channel provider receiving the message authentication code, append the message authentication code to the first message to form a first unit containing the first message and the message authentication code, using the secure channel provider, before passing the first unit to the cryptographic service provider for encryption.

20. The data processing device of claim 17, wherein the program module is further operative to: invoke a cryptographic service provider; and passing the second message to the cryptographic service provider, after the sensitive information is inserted in the first message by the secure channel provider to form the second message, and encrypting the second message using the cryptographic service provider to from the encrypted unit, before passing the encrypted unit to the secure channel provider to be transmitted to the remote device, wherein only the secure channel provider and the cryptographic service provider have access to the sensitive information in an unencrypted form.

21. The data processing device of claim 20, wherein the program module is further operative to: after the sensitive information is inserted in the first message to form the second message, pass the second message to the cryptographic service provider to determine a message authentication code for the second message before encrypting the second message and the message authentication code.

22. The data processing device of claim 17, wherein the source is the at least one memory storage device and the sensitive information is stored as data on the at least one memory storage device.

23. The data processing device of claim 17, wherein the insertion point codes are inserted in the first message by the application program.

24. The data processing device of claim 17, wherein the insertion point codes are inserted in the first message after the first message passes out of the application program and before the first message is passed to the secure channel provider.

25. The data processing device of claim 17, wherein padding elements are added to the first message to allow the sensitive information to be of varied lengths while the first message and the second message have the same length.

26. The data processing device of claim 17 wherein the first message and the second message have the same structure and length.

27. A system for securely transmitting sensitive information to a remote device at the request of an application program, the system comprising:

a peripheral device operative to receive input containing the sensitive information; and a data processing device, directly connected to the peripheral device and operative to transmit data to and receive data from the peripheral device, the data processing device having:

at least one processing unit;

at least one memory storage device operatively coupled to the at least one processing unit; and a program module stored in the at least one memory storage device operative for providing instructions to the at least one processing unit, the at least one processing unit responsive to the instructions of the program module, the program module operative to:

invoke an application program and a secure channel provider running on the data processing device;

generate a request with the application program, to the secure channel provider, to make a transmission to a remote device;

generate a first message with the application program;

generate, with the data processing device, insertion point codes, the insertion point codes indicating locations within the first message where the sensitive information should be inserted when the secure channel provider receives the first message;

insert, with the data processing device, the insertion point codes in the first message;

pass the first message from the application program to the secure channel provider;

transmit the first message to the peripheral device;

in response to receiving an encrypted unit from the peripheral device, transmit the encrypted unit to the remote device with the secure channel provider;

wherein the peripheral device is operative to:
invoke a cryptographic service provider;
in response to receiving the first message from the data processing device, obtain the sensitive information from a source;
insert the sensitive information into the first message at the locations in the first message indicated by the insertion point codes to form a second message containing the sensitive information;
encrypt the second message to form an encrypted unit; and
transmit the encrypted unit to the data processing device,
wherein the sensitive information is unaccessed in an unencrypted form by the application program during the operation of the program module and wherein the peripheral device is only in communication with the remote device through the data processing device.

28. The system of claim 27, wherein the peripheral device calculates a message authentication code for the second message before the second message is encrypted, passes the message authentication code to the data processing system where the secure service provider appends the message authentication code to the first message and passes the first message and message authentication code to the peripheral device to be encrypted.

29. The system of claim 28, wherein the peripheral device contains a card reader and the card reader is used as the source of the sensitive information.

30. The system of claim 28, wherein the peripheral device contains a RFID tag reader and the RFID tag reader is used as the source of the sensitive information.

31. The system of claim 28, wherein the peripheral device contains a keypad and the keypad is used as the source of the sensitive information.

32. The system of claim 27, wherein the peripheral device contains a memory and the memory is used as the source of the sensitive information.

33. The system of claim 27 wherein the first message and the second message have the same structure and length.

* * * * *